United States Patent [19]

Rommelmann et al.

[11] Patent Number: 5,260,718
[45] Date of Patent: Nov. 9, 1993

[54] LIQUID CRYSTAL SHUTTER XEROGRAPHIC PRINTER WITH OFFSET CONFIGURATION LAMP APERTURE AND COPIER/PRINTER WITH OPTICALLY ALIGNED LAMPS, IMAGE BARS, AND LENSES

[75] Inventors: Heiko Rommelmann, Webster; James D. Rees, Pittsford; Richard F. Lehman, Penfield; David D. Hoesly, Webster; Joseph F. Stephany, Williamson; Gary S. Schwarz, Wayne, all of N.Y.

[73] Assignee: Xerox Corporation, Stamford, Conn.

[21] Appl. No.: 816,782

[22] Filed: Jan. 2, 1992

Related U.S. Application Data

[63] Continuation of Ser. No. 474,195, Jan. 24, 1990.

[51] Int. Cl.⁵ .................. G01D 15/14; G03G 15/18
[52] U.S. Cl. .................. 346/107 R; 355/202; 359/227
[58] Field of Search .................. 359/54, 55, 85, 227, 359/232; 355/200, 1, 238, 234; 358/482, 483; 346/107 R; 178/15, 90; 354/4, 5; 350/333

[56] References Cited

U.S. PATENT DOCUMENTS

| | | | |
|---|---|---|---|
| 4,095,888 | 6/1978 | Kawazu et al. | 355/4 |
| 4,147,928 | 4/1979 | Green et al. | 235/454 |
| 4,376,282 | 3/1983 | Kotani et al. | 346/107 R |
| 4,386,836 | 6/1983 | Aoki et al. | 355/3 |
| 4,435,064 | 3/1984 | Tsukada et al. | 346/107 R |
| 4,477,175 | 10/1984 | Snelling | 355/3 |
| 4,549,223 | 10/1985 | Ozawa | 358/482 X |
| 4,595,259 | 6/1986 | Perregaux | 350/331 |
| 4,660,052 | 4/1987 | Kaiya et al. | 346/76 PH |
| 4,706,130 | 11/1987 | Yamakawa | 358/296 |
| 4,728,972 | 3/1988 | Stephany et al. | 346/160 |
| 4,742,240 | 5/1988 | Yamanishi et al. | 358/483 |
| 4,767,190 | 8/1988 | Dir et al. | 350/339 R |
| 4,783,146 | 11/1988 | Stephany et al. | 350/331 R |
| 4,835,549 | 5/1989 | Samajima et al. | 346/107 R X |
| 4,884,079 | 11/1989 | Inoue et al. | 346/107 R |
| 5,003,323 | 3/1991 | Onuki et al. | 346/76 PH |

OTHER PUBLICATIONS

"Liquid Crystal Shutters for Printers", By M. Nagata & H. Nakamura, Published in Mol. Cryst. Lic. Cryst, 1986 vol. 139, pp. 143 to 160.

"How Liquid Crystal Shutters Are Used For Light Control In Non-Impact Printers", by Y. Kawamura, Office Equipment and Products, vol. 13, Dec. 1894, pp. 60-66.

*Primary Examiner*—Benjamin R. Fuller
*Assistant Examiner*—David Yockey

[57] ABSTRACT

A xerographic printer especially suitable for printing copies of oversized original documents is enabled by staggering a plurality of image bars in optical alignment with a linear projection means such as gradient index lens arrays which are tilted at a preferred angle. The image bars are selectively addressed in response to digitized bit-mapped data inputs representing the document information. The modulated light outputs from the bars are transmitted as focused lines on the surface of the photoreceptor. The printer includes illumination lamps and a lamp aperture which parallels the staggered image bars. Further, a multi-function copier/printer is realized by combining a variation of the xerographic printer with a conventional imaging system for copying a document.

2 Claims, 8 Drawing Sheets

LIQUID CRYSTAL SHUTTER XEROGRAPHIC PRINTER WITH OFFSET CONFIGURATION LAMP APERTURE AND COPIER/PRINTER WITH OPTICALLY ALIGNED LAMPS, IMAGE BARS, AND LENSES

This is a continuation of application Ser. No. 474,195, filed Jan. 24, 1990.

BACKGROUND AND PRIOR ART STATEMENT

The present invention relates to an electrophotographic printer utilizing an addressable image bar as the imaging device, and, more particularly, to a printer which utilizes a plurality of addressable image bars arranged generally linearly in an alternately staggered orientation.

The use of addressable image bars in an electrophotographic printing environment is known in the art. U.S. Pat. No. 4,386,836 discloses a printer in which a "optical writing unit" in conjunction with an imaging lens forms a latent image on a photoreceptor surface. The "optical writing unit" includes a light source which illuminates a liquid crystal shutter apparatus. Depending on the transmissivity of the individual shutters (which is set by a prescribed data input signal), light that passes through the shutter exposes the photoreceptor. U.S. Pat. No. 4,595,259 describes another printing system which includes a liquid crystal image bar which selectively transmits light into a lens so as to form latent electrostatic images a line at a time on a photoreceptor surface. The lens may be a conventional lens or a linear lens such as a Selfoc ™ lens array.

U.S. Pat. No. 4,728,972 discloses the exposure of a xerographic drum through a liquid crystal bar controlled by a multiplexing driving circuit.

Also of interest as background for the use of liquid crystal bars in printers are the following articles: "Liquid Crystal Shutters For Printers" by M. Nagata and H. Nakamura, published in *Mol. Cryst. Lic. Cryst.*, 1986, vol. 139, pages 143 to 160; and "How Liquid Crystal Shutters Are Used For Light Control In Non Impact Printers" by Y. Kawamura, published in *Office Equipment and Products*, vol. 13, December 1984, pages 60 to 66.

Another type of addressable image bar used in electrophotographic printers is disclosed, for example, in U.S. Pat. No. 4,477,175. As disclosed the image bar comprises a plurality of individually activated light emitting diodes (LEDs).

The image bars disclosed in the above patents and publications are linear substrates having an effective length equivalent to the width of the standard letter size document, e.g. 8½ inches. As a general observation, the longer the image bar length, the greater the difficulty of manufacturing and the greater the cost. The reason for this is that the yield of these bars decreases exponentially with increased pixel density in active areas in a linear direction.

SUMMARY OF THE INVENTION

According to the first aspect of the present invention, an image bar of effectively increased length is realized when a plurality of image bars linearly aligned in a staggered orientation are optically aligned with their outputs focused to a common line at a photoreceptor. The bars are displaced from each other in a direction perpendicular to the process direction of the moving photoreceptor. This concept of staggering shorter image bars to effectively form a bar of longer length enables a second aspect of the invention: the ability to print documents of a much greater width than the current letter size. For example, engineering drawings with widths up to 36 inches can be formed by a plurality of bars arranged according to the teachings of the invention.

According to a still further aspect of the invention, a multifunction copier/printer is enabled by creating an architecture whereby the image bars are positioned so as to permit an additional imaging path to be established therebetween. This arrangement makes possible a machine which conventionally copies documents placed on a platen as well as printing documents electronically.

More particularly, the present invention is directed toward an electrophotographic printer for line by line exposure of a moving photoreceptor surface, and includes an imaging system comprising a plurality of image bars aligned linearly in two parallel rows, a pair of linear lens arrays positioned between said image bars and said photoreceptor surface, each lens array optically aligned with one of said image bar rows, said lens array being tilted with respect to one another, and means for selectively addressing said image bars to create a modulated light output whereby said lens arrays transmit the output of the image bars in each row to a common focus line at the photoreceptor surface.

DESCRIPTION OF THE INVENTION

Figure 1:
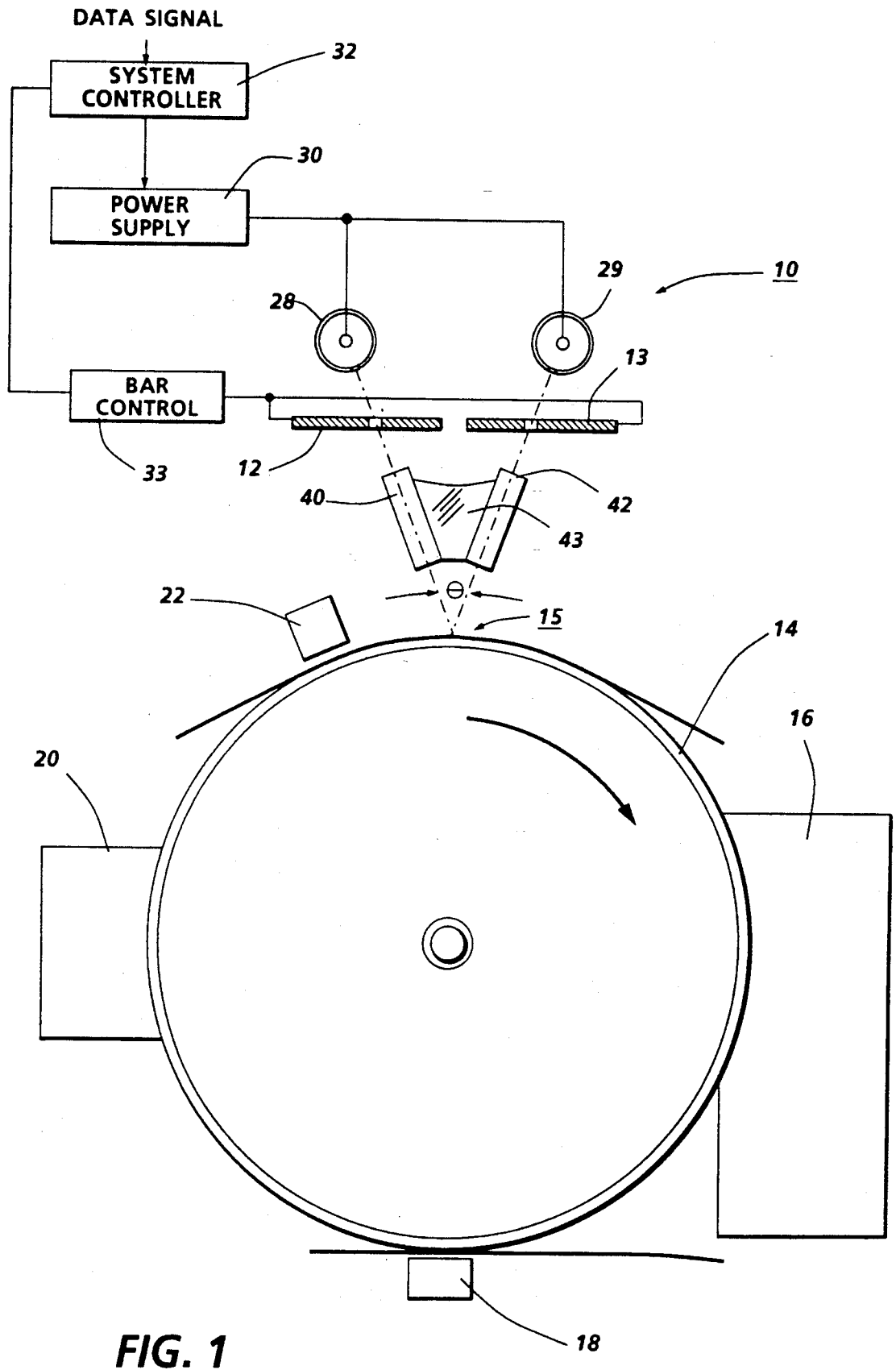
FIG. 1 shows a side view of an imaging system for an electrophotographic printer incorporating the staggered liquid crystal image bar assembly according to the present invention.
Figure 2:
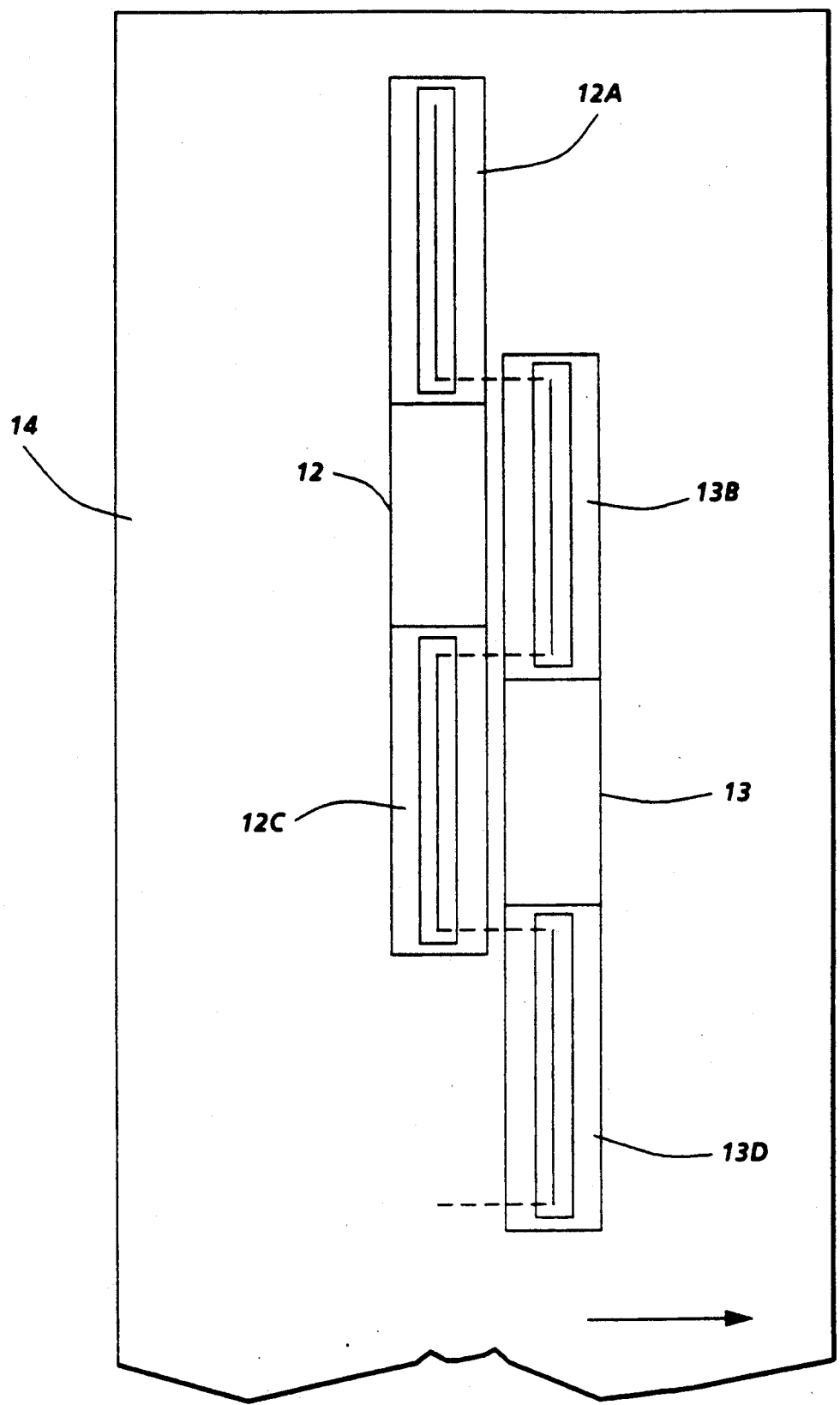
FIG. 2 is a top view of the FIG. 1 system.

Referring to FIG. 1, there is shown an electrophotographic printer 10 utilizing an image bar assembly constructed according the principles of the present invention and arranged in a horizontal plane. Although the invention is described as utilizing liquid crystal image bars, other types of image bars may be used; for example, an LED image bar addressed by appropriate control means. The printer 10 includes a series of process stations through which a photoreceptor drum 14 passes beginning with the image station 15 where the latent electrostatic image is formed. Drum 14 moves past development station 16, transfer station 18, cleaning station 20, and corona charging station 22. A pair of illumination sources 28, 29 which in a preferred embodiment are T12 apertured fluorescent lamps, are energized by high frequency power supply 30 under control of system controller 32. Lamps 28, 29 illuminate assemblies 12 and 13, respectively. Bar assembly 12 contains two liquid crystal image bars 12A, 12C; (FIG. 2) bar assembly 13 contains two liquid crystal image bars 13B, 13D. As shown in FIG. 2, the image bars are arranged to form linear arrays with each image bar being offset or staggered from the others. Each image bar has two offset rows of linear liquid crystal pixels. The transmissive state of each image bar is determined by selective application of a voltage to a plurality of electrodes on the image bar substrate. Bar control circuit 33 energizes the appropriate electrodes in response to digitized bit-mapped data input representing document information typically sent from a charge coupled device or from a computer and stored in controller memory. Bar control circuitry 33 is discussed in further detail below. Each bit of data is polarized ("1" or "0") to indicate whether the picture elements "pixels" it represents is to be printed black or white. Depending upon the individual liquid crystal shutter activation, image bars 12A, 13B, 12C, 13D selectively pass light to a pair of linear gradient index lens arrays 40, 42, which in a preferred embodiment are Selfoc TM SLA 12 lenses manufactured by Nippon Sheet Glass Company. The lenses image the light outputs (as two linear arrays of dots) from the staggered arrays as two lines at the photoreceptor surface. Lenses 40, 42 are tilted with respect to each other by an angle $\theta$, which in the preferred embodiment is 30° although a range between 15° and 4020 has been found acceptable. The space between the lenses is filled with an opaque spacer 43. With conventional lenses, such a tilted field would produce unacceptable image degradation at the photoreceptor, but the properties of gradient index lenses, which form an erect image, result in much less distortion.

From the above description, it will be appreciated that by staggering the image bars, and by using appropriately longer gradient index lens arrays, images can be formed on the photoreceptor which are the sum of the length of each modulated image bar formed in the linear arrays.

Figure 3:
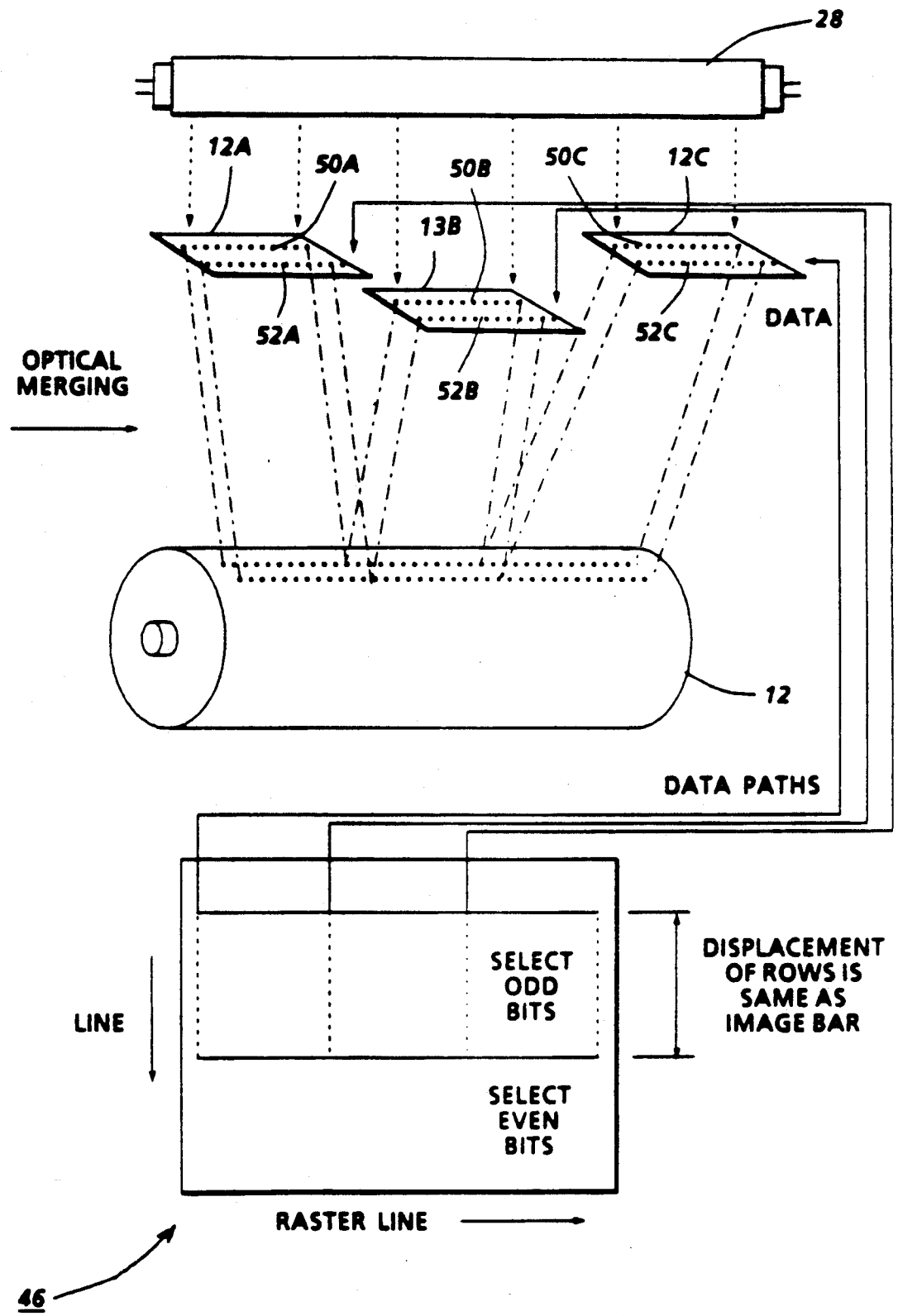
FIG. 3 is a side perspective view of the imaging system of FIG. 1 together with a representation of the data flow to the image bars

According to a second feature of the invention a method of registering the image bar in the process and scan direction is presented so as to ensure proper overlap at the ends of the bar to accommodate the required "stitching" of the several focused bar images. Referring to FIG. 3 there is shown a side prospective view of FIG. 1 showing three of the bars (12A, 13B, 12C) beneath lamp 28. The Selfoc TM lens arrays have been omitted for clarity of description. The registration problems to be solved are: (1) to register each of the bars in the process direction so that the portions of the scan line projected from bar 13B align with the correct positions of scan lines projected from bars 12A and 12C, and (2) to register the bars in the scan direction to ensure that projected pixels do not overlap or leave a gap. As shown in FIG. 3 the raster formatted input data is recovered and stored in data buffer 46, located in bar control 33 as shown, and then read out in proper sequence to the three bars. It is evident that the data must be divided into three columns and directed to each of the three bars. Since the bars are multiplexed, i.e., each possesses two offset rows 50, 52 of pixels, with both energized at the same time. Since these odd and even rows are offset, the data supplied must be similarly offset. In order to obtain this offset, the data is read out of memory displaced by this offset, as shown.

Figure 4:
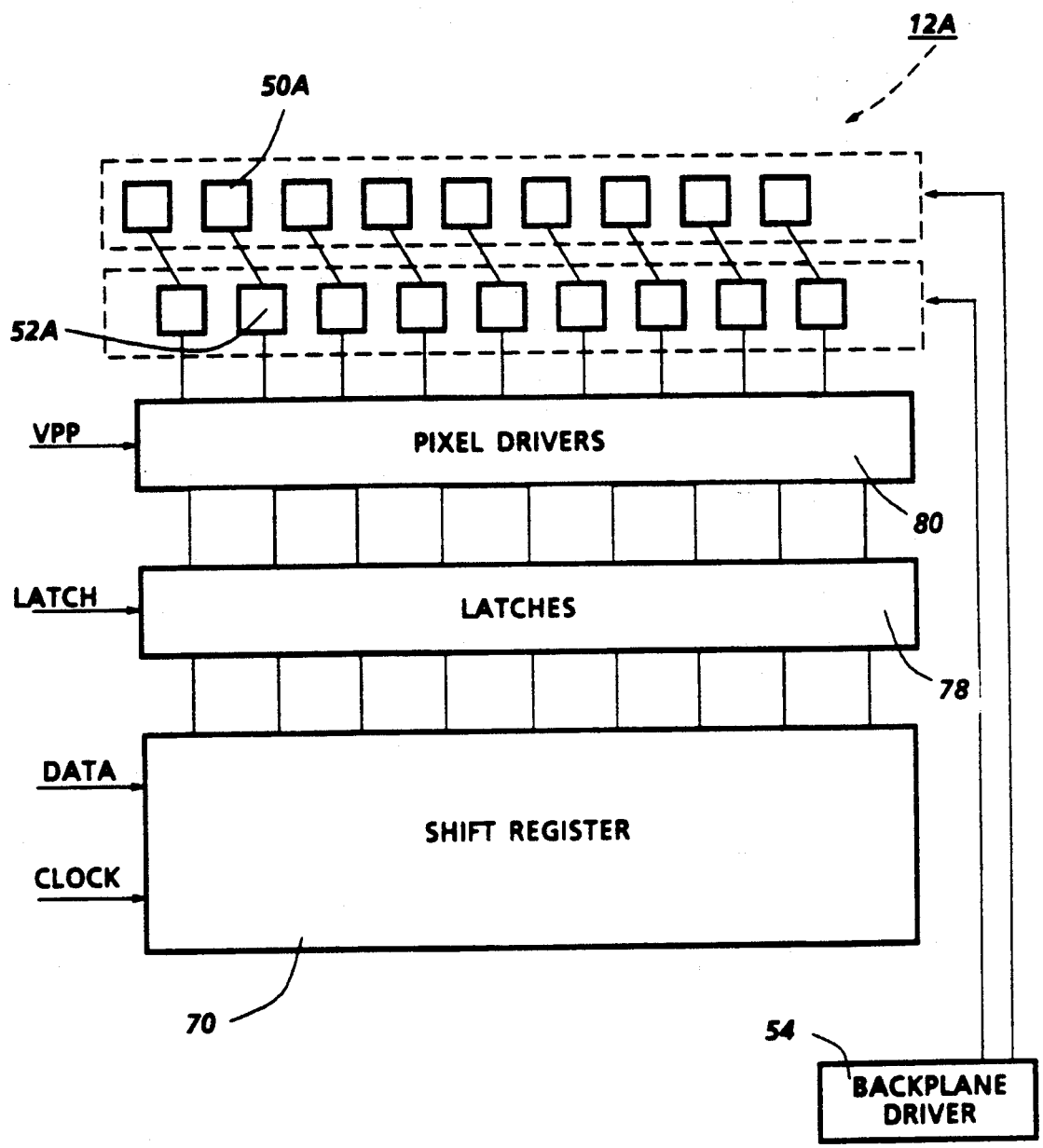
FIG. 4 is a schematic representation of the drive circuit of an image bar.
Figure 5:
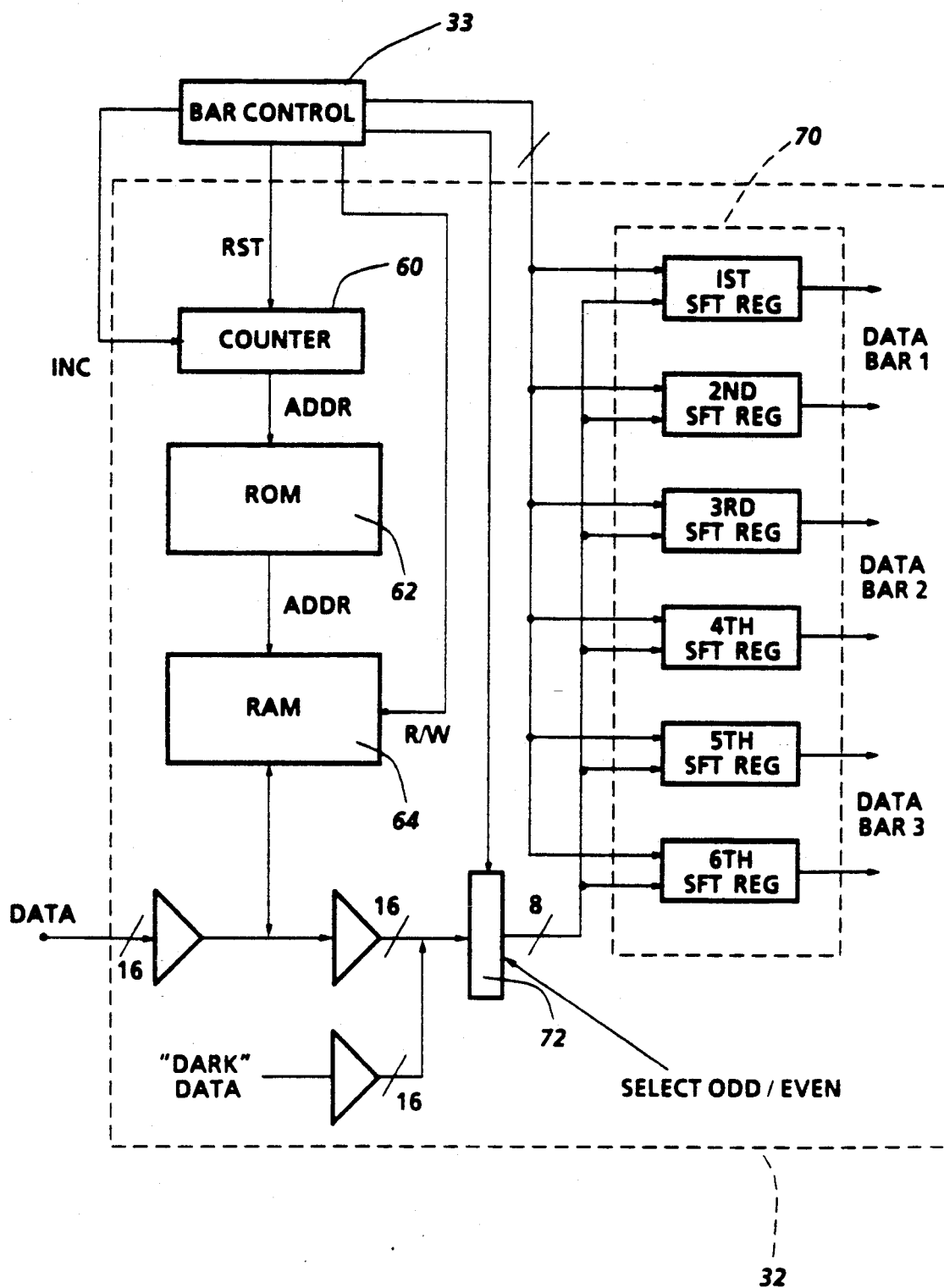
FIG. 5 is a block diagram of the data flow control circuits for the image bar.

FIG. 4 is the functional representation of one of the image bars (12A) and associated driving circuit. As shown, there are two rows of pixels 50A, 52A (odd and even), of which one is active, based on the voltage applied by a backplane driver circuit 54. Each pixel driver thus services two adjacent pixels in this 2:1 multiplexing approach. The offset (in the process direction) between the rows of odd and even pixels gives rise to the different loci in the data buffer 46 (FIG. 3) from which odd bits and even bits are alternately selected. The system is block-diagrammed in FIG. 5. Referring to FIGS. 4 and 5, there is within bar controller 32 a binary counter 60, whose outputs select different locations in ROM 62. Each ROM locus holds a value which is an address in RAM 64 at which words of the incoming scan line will be stored, or from which words will be selected as their bits are dumped to the image bar. The sequence of operation is as follows: (1) data to be written into RAM 64 is presented to the RAM data input. The location of the address where these data are to be stored is located in ROM 62 and presented to the RAM. A R/W signal from bar control 33 signals the RAM to write the data. (2) The controller increments counter 60 so that ROM 64 now outputs the address of the data to be dumped into the first top register of shift register circuit 70. On the first half cycle, only the odd bits are chosen by a selection circuit 72. These data follow the data path to the shift register. (3) Control 33 increments counter 60 and suitably selected data are sent to the second shift register. (4) Then another 16 bits of data are written into RAM 64. (5) The third and fourth shift registers are loaded while the first and second shift registers are clocked out. (6) More data are written into RAM. (7) The fifth and sixth shift registers are loaded while one through four are being shifted out. (8) The sequence continues until all the odd bits of one line are in the correct position in the image bars; then they are latched by latching circuit 78 (FIG. 4). (9) The selector 72 shifts to choose the even bits, which are then sent to the shift registers in the image bars while the odd bits are printing.

There are two shift registers on each bar because, given the rate at which the bit map must be dumped to the bars to accommodate the process speed, the pixel driver 80, (FIG. 4) on the bars are not fast enough to shift all the data serially from one end of the bar to the other; hence, shift rates are halved by shifting two shift registers with the same clock, with each shift register receives its appropriate data by the system of FIG. 4.

Figure 6A:
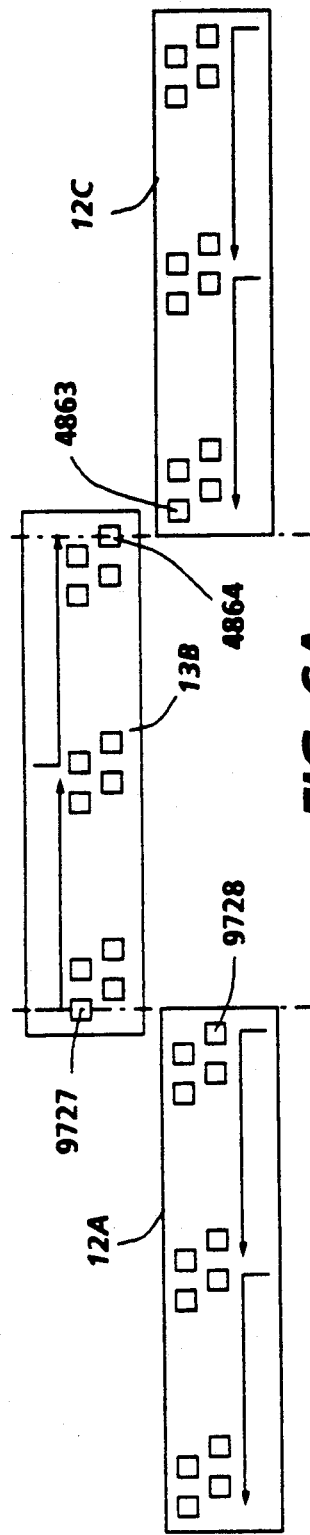
FIGS. 6A, 6B, and 6C are schematic representations of three butting configurations possible with three adjacent image bars.
Figure 6B:
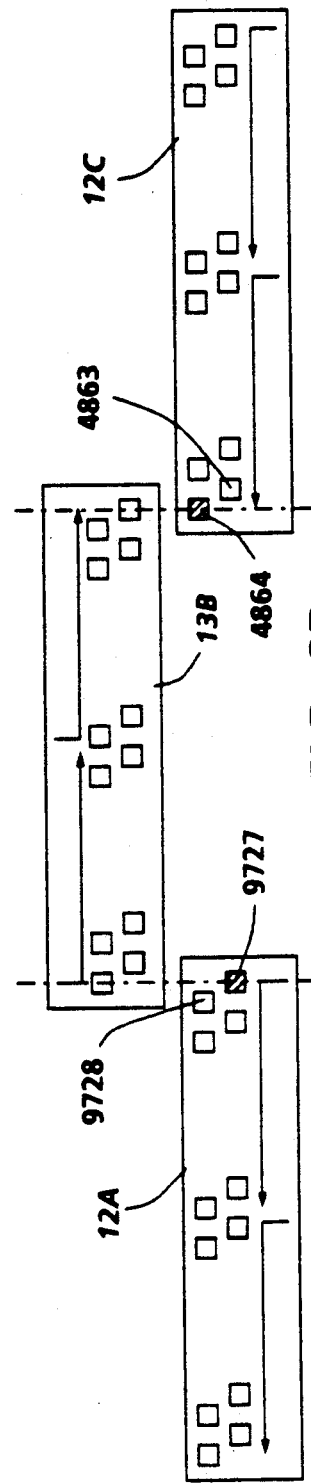
Figure 6C:
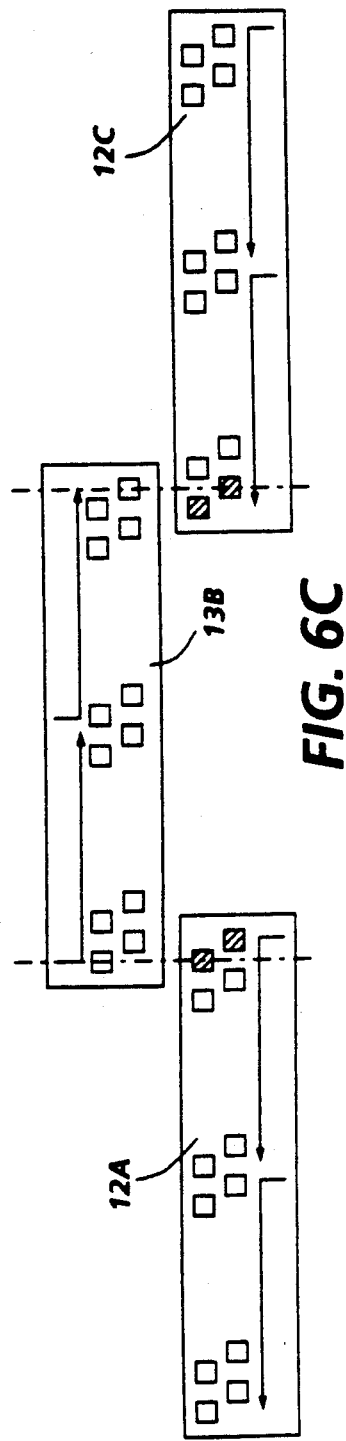

The problem of registration in the scan direction is illustrated in FIG. 6, where, in the top sketch, FIG. 6A, bars 12A, 13B, 12C are perfectly butted with neither overlap nor gap present. The center sketch, FIG. 6B, assumes a one-pixel overlap on each end, where bars 12A and 12C each overlap bar 13B by one pixel. Although equal overlaps are shown, the present invention allows independent correction for overlap of bars 12A and 12C with bar 13B. Shift registers 70 (FIG. 4) serially shift the video data in the direction indicated by the two arrows on each bar. A scan line consists of 14,592 bits, numbered 0 through 14,591. Each image bar is illuminated from above by a fluorescent lamps 28, 29 as shown in FIG. 1. The image from the dark or clear pixels of each bar is projected down onto the drum 12 as shown in FIG. 3. Since the bars have two rows of pixels at the imaging plane, the drum surface sees alternately a row of odd pixel data followed by a row of even pixel data (which rows are displaced in time based on process speed and inter-row spacing on the bars). Although the ends of the rows of imaged pixels can in principle be juxtaposed at the drum surface via projection optics, adjacent bars cannot be butted (because edge-sealing requirement for the bar occupy some minimum width, typically 1/16 inch). Further, space constraints sometimes dictate that even the projected pixel rows (i.e., as seen at the drum surface) be displaced in the process direction, in which case the rows selected to be dumped to Bar 13B must be delayed from those selected to be dumped to Bars 12A and 12C.

There are several concerns to address when overlapping the bars; the present invention accommodates each concern. They will be discussed while assuming that the middle bar 13B, always receives its bits registered properly, and that the bits going to bar 12A and 12C will be shifted to accommodate an overlap with bar 13B. Given the shift direction of the data, if there is an overlap by 12A, data must be shifted farther, each bit of overlap resulting in a bit being lost on the far end (the first lost is 14,591, then 14,590, etc.). This ensures that scan line bit 9728 (in bar 12A) will always be the one imaged next to bit 9727 (in bar 13B). Also, the second shift register feeding that portion of bar 12A closest to the overlap, must fill in the final bit(s) with "dark" data so as not to "overwrite" bits of bar 13B. Similarly, bar 12C's data must be shifted fewer clocks with increasing overlap (the first bit lost is 0, then 1, etc.). Thus, scan line bit 4863 (bar 12C) will always image next to bit 4864 (bar 13B). Here the shift register must first shift in dark data, which are simply shifted off the end in the case of no-overlap positioning. Another concern which must be addressed is that, since each shift register handles an integral number of 16-bit words, as overlapping occurs the first bits which would normally be shifted into the second register must be shifted last into the first register. Also, the last bits which would normally be shifted into the fifth register must be shifted first into the 6th bar register. This process is further complicated by the fact that, for odd-bit overlaps of bar 12A, an odd bit jumps the SR 1/SR2 boundary, but an even bit doesn't. Also, for odd-bit overlaps of bar 12A, an even bit jumps the SR5/SR6 boundary, but an odd bit doesn't. The final concern is that the odd/even polarity of the bits is, for odd bit overlaps, different from that for even bit overlaps. Referring again to FIG. 6, note that in the top and bottom panels (zero and two bit overlaps, respectively), the odd bits are in the top row for all three bars. However, in the center panel, bars 12A, 12C's even bits are in the top row. To provide an interface between the byte-serial data stream (provided by an ESS) and the data going to the bar's shift registers, and according to the present invention, the RAM 64 (FIG. 5) is filled with incoming scan line video data, and simultaneously dumped to the bars based on the overlap(s) and the process direction displacement of bar 13B with respect to bars 12A, 12C. The addresses in RAM for fill and dump are contained in ROM 62; switches select different ROM areas (and hence different RAM addresses) for different process-direction displacements. Other switches determine the amount by which the video data is advanced in the scan direction (for bar 12B) or delayed in the scan direction (for 12C) based on the respective overlaps.

In a preferred embodiment, the liquid crystal image bar is a transient nematic liquid crystal driven by a single frequency voltage source. The liquid crystal device is disclosed in U.S. Pat. No. 4,595,259 and an improvement thereto is disclosed in U.S. Pat. No. 4,767,190. These patents describe the construction and operating parameters suitable for the present liquid crystal array and their contents are hereby incorporated by reference. A driver multiplexing circuit, disclosed in U.S. Pat. No. 4,783,146, is suitable for the driving circuit for the present liquid crystal array, and this patent's contents are also hereby incorporated by reference.

The above printing system is seen to provide a means for imaging focused lines at a photoreceptor surface by optically and electronically stitching together the alternating linear outputs from a series of staggered liquid crystal shutter arrays. This arrangement can be used in a conventional system for printing letter size documents by replacing the single linear shutter array with a plurality of shorter staggered and offset arrays thereby enhancing the yield of the array production. The novel construction also enables a hitherto unrealized printing function; printing oversize documents such as engineering drawings having widths up to 36 inches. The increased widths are achieved by forming substrates of a desired length and arranging a plurality of liquid crystal image bars in a staggered array sufficient to realize the desired length.

Figure 7:
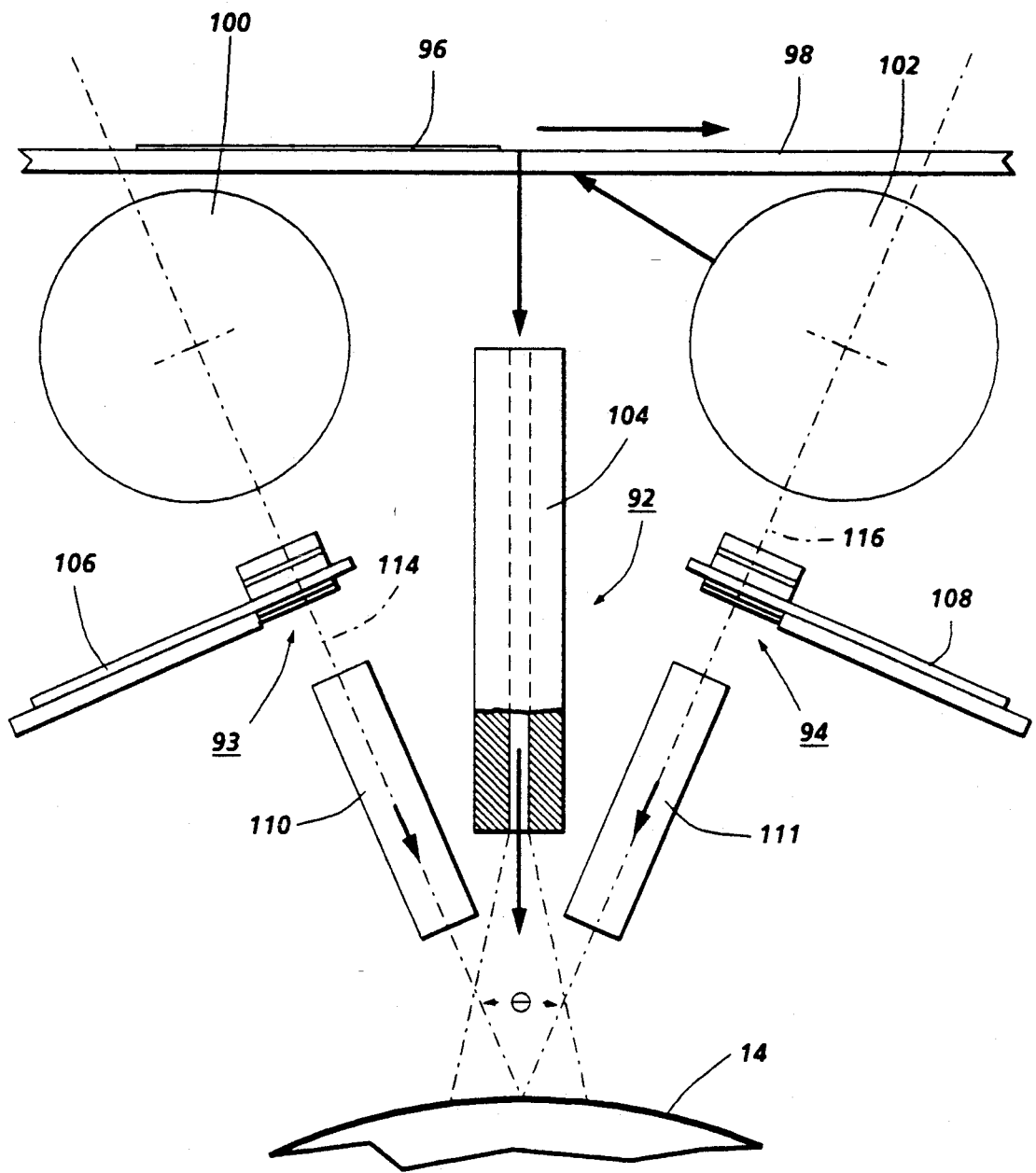
FIG. 7 is a side view of a copier/printer incorporating two liquid crystal image bar assemblies to enable the print function and a conventional optical assembly to enable the function of copying a document on a document platen.

According to a further aspect of the invention, a multifunction machine is enabled which incorporates a variation of the FIG. 1 construction. As shown in FIG. 7, a multifunction copier/printer 90 is realized by combining a conventional imaging system 92 with liquid crystal image bar assemblies 93, 94. The photoreceptor drum 14 is shown in partial form only; the various xerographic stations (not shown) are similar to those described above with relation to FIG. 1. For the conventional copying mode a document 96 is moved across the surface of platen 98 by conventional CVT (Continuous Vacuum Transport) means. The document is incrementally illuminated by illumination from a pair of fluorescent lamps 100, 102. Light is reflected downward and is imaged by Selfoc ™ lens 104 (SLA 6 is suitable) onto the surface of drum 14 creating a line by line exposure of the document and forming a latent image which is then developed, transferred to paper and fused. When a print mode is selected, the liquid crystal shutter imaging systems 93, 94 are enabled and subsequently controlled by signals from controller 32. Imaging system 93 comprises a liquid crystal image bar assembly 106, and associated Selfoc ™ lens 110, (SLA 12 is used). Imaging system 94 comprises a liquid crystal image bar assembly 108 and associated Selfoc ™ lens 111. Image bar assembly 106 and lens 110 are optically aligned along center line 114; image bar assembly 108 and lens 111 are perpendicularly and optically aligned along center line 116. The two sets of components aligned along center lines 114, 116 form an angle $\theta$ and are sufficiently displaced from each other in their process direction to accommodate the copier imaging system 92. Image bar assemblies 106 and 108 are constructed and addressed in the same manner described above for assemblies 12, 13. Image bar assemblies 106, 108 are selectively activated by controller 32 to selectively transmit light from respective fluorescent lamps 100, 102 (which for this embodiment, are considered as part of imaging systems 90, 94), depending on mode activation. Although the FIG. 7 embodiment contemplates a liquid crystal type of image bar to achieve the desired large copy reproduction, the invention can also be practiced with other types of staggered image bars such as light-emitting diode arrays whose output is selectively controlled by the input data stream.

Figure 8:
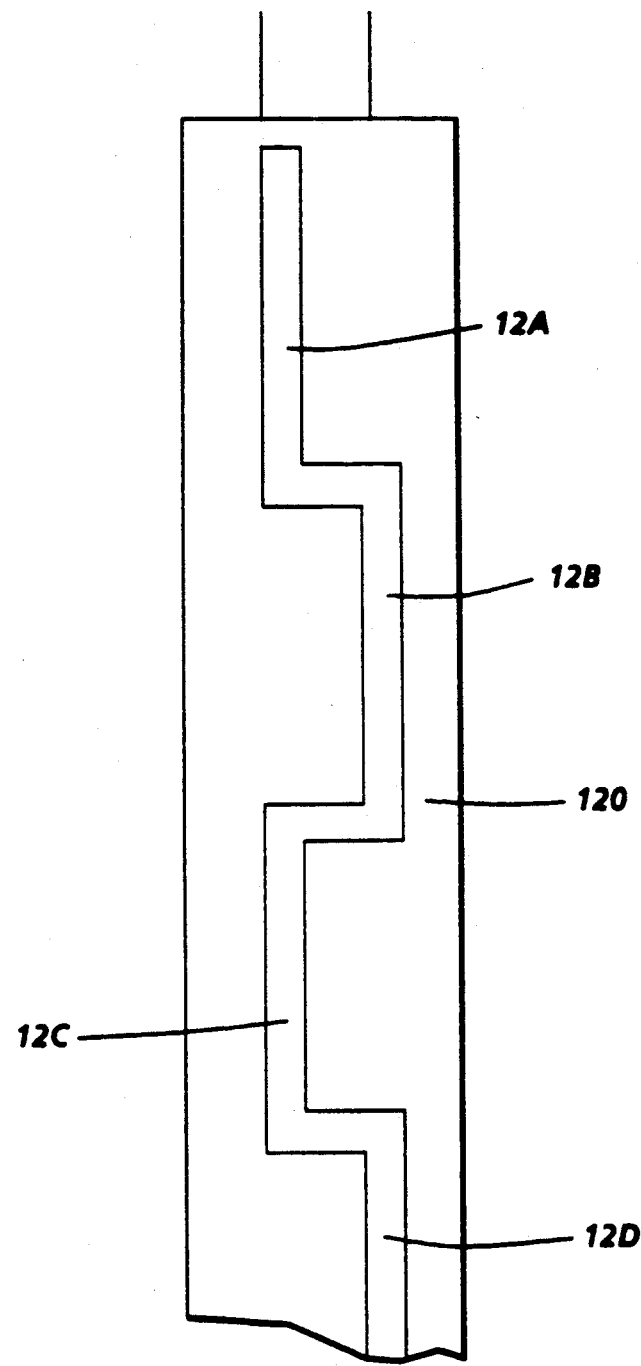
FIG. 8 is a bottom view of the illuminator source for the image bar showing an aperture which complements the offset structure of the underlying image bars.

According to a still further aspect of the present invention the illumination efficiency of the FIG. 1 system may be improved by using a narrow "jogging" or offset configuration lamp aperture for the illumination lamp as shown in FIG. 8. FIG. 8 is a bottom view looking upward at the lamp aperture. A "jogging" shutter 120 has a design which parallels the staggered array rows aligned beneath the lamps.

While the invention has been described with reference to the image bars being used in conjunction with an imaging lens to form an image on a photosensitive surface, the invention also has utility as a document input scanner. For example, if an oversized document is to be scanned in a CVT (continuous velocity transport) mode, a plurality of photosensitive diode arrays can be aligned linearly in the image plane. The document to be digitized is incrementally scan illuminated and the reflected image is focused by a gradient index lenses onto the two rows of stitched together diode array image bars. Further modifications or changes are intended to be included within the scope of the following claims:

What is claimed is:

1. In an electrophotographic printer for line by line exposure of a photoreceptor surface, moving in a process direction, an imaging system comprising two rows of liquid crystal image bars, each including two offset rows of liquid crystal shutter arrays, a pair of linear lens arrays positioned between said image bars and said photoreceptor surface, each of said lens arrays optically aligned with one of said liquid crystal offset rows, each of said lens arrays being tilted with respect to one another and control means for selectively addressing said image bars to create a modulated focused line in the scan direction at the photoreceptor surface, said control means including an illumination source for directing output radiation from said source onto each of said image bars and wherein said illumination source includes an aperture, said aperture having an offset configuration which parallels the image bars.

2. A multi-function copier/printer apparatus for selectively forming latent images on a moving photosensitive surface at an image station, the apparatus comprising:

an imaging copy system for reproducing a document being moved through an exposure zone in an object plane having a central axis, said imaging copy system including a first and second illumination lamp positioned beneath said exposure zone, each said lamp having a central axis, linear projection means for projecting image rays reflected from said document moving through said exposure zone onto said photosensitive surface at said image station forming a latent image of the document on said surface, said apparatus further including an imaging printing system for forming a modulated light pattern on said photoreceptor surface at said image station in response to a video data input representing documents to be reproduced, said imaging printing system including a first image bar providing a light output and associated gradient index lens array optically aligned along a first path which extends from the central axis of said first illumination lamp to said image station and a second image bar providing a light output and an associated gradient index lens array optically aligned along a second path which extends from the central axis of said second illumination lamp in said image station, said first path and second path intersecting each other at the photosensitive surface forming an angle therebetween, and control means for receiving said input and having means for selectively addressing each said image bar to selectively control the light output and whereby the light output of each said image bar is focused onto a common line at the image station.

* * * * *